United States Patent
Schwemmer

[11] 3,798,916
[45] Mar. 26, 1974

[54] ARTICULATED ENERGY ABSORBING MARINE FENDER ASSEMBLY

[75] Inventor: Leonard J. Schwemmer, Erie, Pa.
[73] Assignee: Lord Corporation, Erie, Pa.
[22] Filed: Nov. 15, 1971
[21] Appl. No.: 198,889

[52] U.S. Cl. ..................... 61/48, 114/219, 267/140
[51] Int. Cl. ............................................... E02b 3/22
[58] Field of Search ................. 61/46, 48; 114/219; 213/220, 221, 222; 267/139, 140; 293/66, 85; 182/137

[56] References Cited
UNITED STATES PATENTS

| | | | |
|---|---|---|---|
| 1,598,369 | 8/1926 | Foster | 182/137 |
| R27,318 | 3/1972 | Gensheimer | 61/48 |
| 970,848 | 9/1910 | Patronaggio | 114/219 |
| 982,643 | 1/1911 | Stone | 61/48 |
| 1,547,511 | 7/1925 | Maciejczyk et al. | 61/48 X |
| 1,640,222 | 8/1927 | Slowik | 293/85 |
| 3,464,213 | 9/1969 | Stephenson | 61/48 X |
| 3,630,035 | 12/1971 | Wanneroy | 61/48 X |

Primary Examiner—Mervin Stein
Assistant Examiner—David H. Corbin
Attorney, Agent, or Firm—James W. Wright, Esq.

[57] ABSTRACT

A marine structure such as a pier, vessel or the like is protected from a mooring marine vessel by a marine fender assembly. The marine fender assembly preferably includes a fender spaced from and extending horizontally along the structure and resilient mounting means, preferably a plurality of discrete elastomeric buckling columns, spaced along and extending between the fender and structure for absorbing the impact energy of the mooring marine vessel. To improve the efficiency of the resilient mounting means and reduce force levels during impact, articulating means is disposed between the fender and structure in series with the resilient mounting means and operatively interconnects the fender and structure for allowing the fender to be articulated without significant deflection of said mounting means relative to the marine structure.

23 Claims, 23 Drawing Figures

PATENTED MAR 26 1974　3,798,916

ARTICULATED ENERGY ABSORBING MARINE FENDER ASSEMBLY

This invention relates to a marine fender assembly for absorbing the impact energy of a mooring marine vessel and more particularly to a marine fender assembly employing resilient mountings for absorbing the impact energy. The fender assembly may be mounted alongside a pier, directly to the hull of a vessel or to any other marine structure that may be subject to the impact energy of a mooring marine vessel. However, for purposes of the description to follow, the fender assembly will be described mounted alongside a marine pier, the preferred manner of use of the present invention.

BACKGROUND

In order to minimize the impact energy of a mooring or docking marine vessel, such vessels typically approach marine piers at very low speeds and angles, usually no greater than about 15°. However, with the large marine vessels in use today and even larger expected in the future, there is an ever increasing need for very efficient and high energy absorbing fender assemblies which are operative where the above mooring or docking procedure is employed. In addition to absorbing the impact energy of a mooring or docking vessel, it is desirable that the energy be absorbed at relatively low force levels. Failure to provide suitable fender assemblies alongside a pier can result in structural damage to the pier and/or vessel.

Many fendering assemblies and resilient mountings for use in such fendering assemblies have been proposed and are currently in use. In these conventional fendering assemblies, a fender supported by piles or the like is spaced from and extends horizontally and vertically along the pier and has a marine vessel-engaging surface remote from the pier. Resilient mounting means, usually a plurality of discrete resilient mountings are spaced horizontally and sometimes vertically along and extend horizontally between the fender and pier. Upon engagement of a marine vessel with the marine-vessel engaging surface, the spaced resilient mounting means are deflected toward the pier to absorb a substantial portion of the impact energy. However, depending on the angle of approach of the marine vessel, the spaced resilient mounting means and are non-uniformly loaded in various degrees. Such non-uniform loading results in less than efficient use of the resilient mounting means, particularly wherein the resilient mounting means have non-linear spring rates characteristics, and causes unnecessarily high impact or reaction forces on the pier and vessel.

A similar problem is encountered where the resilient mounting means are spaced vertically. However, in this instance, the cause is not attributed to the approach angle of the vessel but rather to engagement of a vertically planar fender with a non-vertically planar surface of the marine vessel. Such non-vertically planar engagement may be caused by such things as a roll or tilt of the vessel and the like.

Furthermore, the non-uniform loading problem discussed above causes line and sometimes point contact loading between the fender and vessel. This results in large compressive stresses in the contact area which may lead to vessel hull damage. Thus, the advantages of the fender are not fully utilized, particularly immediately upon engagement of the fender by the vessel. In addition, the excessively large impact forces require larger and stronger pier structures which add to the cost of establishing and maintaining a pier at which relatively large vessels may dock.

SUMMARY OF INVENTION

With the above in mind, it is an object of the present invention to provide a marine fender assembly which efficiently absorbs the impact energy of a mooring marine vessel.

It is another object of this invention to provide a marine fender assembly which minimizes the impact or reaction force of a mooring marine vessel.

A further object of this invention is to provide a marine fender assembly wherein the impact or reaction force is transmitted to the mooring vessel over a relatively large surface area.

In a preferred embodiment of the present invention, the above objects and others are accomplished by providing in combination with a marine structure such as a pier, a fender spaced from and extending horizontally along the structure. In the case of a pier, resilient mounting means, preferably a plurality of substantially identical discrete elastomeric buckling columns, are spaced along and extend horizontally between the fender and pier for absorbing the impact energy of a mooring vessel. The novel feature of this invention resides in articulating means, preferably elastomeric bearing means, symmetrically disposed elastically relative to and in series with the spaced resilient mounting means between the fender and pier. The articulating means allows the fender to be moved by the impact of the mooring marine vessel so that the fender engages a substantial area of the vessel hull prior to deflection of the resilient mounting means. As a result, the spaced resilient mounting means substantially uniformly absorb the impact energy and minimize the impact or reaction forces on the pier and vessel hull. In addition, the impact or reaction force is distributed over a large surface area of the vessel hull to lessen the likelihood of damage thereto.

BRIEF DESCRIPTION OF DRAWINGS

Some of the objects of the invention having been stated, other objects will appear as the description proceeds, when taken in connection with the accompanying drawings, in which.

DESCRIPTION OF PREFERRED EMBODIMENTS

Figure 1:
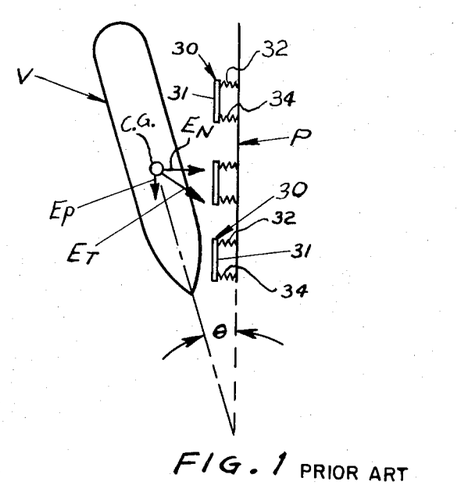
FIG. 1 is a schematic plan view illustrating the mooring of a marine vessel against a plurality of conventional fender assemblies adjacent a pier.

Referring specifically to the various FIGS. wherein like reference characters are used to indicate like parts, where possible, there is illustrated schematically in plan view in FIG. 1 the approach of a marine vessel V for mooring alongside a pier P. The vessel V is approaching the pier P at angle $\theta$ which normally does not exceed about 15°. As illustrated the approach angle $\theta$ is defined as the included angle between the longitudinal axis of the vessel V and a seaward facing longitudinal edge of the pier P. The vessel V has a center of gravity C.G. from which extends vector $E_T$ representing the total kinetic energy and effective direction of travel of the vessel V. This vector $E_T$ can be and is broken down into vector $E_N$ normal to the pier P and vector $E_P$ parallel to the pier P. It is energy represented by vector $E_N$ that will be transmitted from the vessel V to the pier P during the mooring operation unless some energy absorbing means are employed.

In order to absorb a substantial portion of the impact energy $E_N$, a plurality of identical conventional fender assemblies 30 are provided in spaced apart relation horizontally alongside the pier P which will be hereinafter described in detail to more clearly illustrate the problems solved by the present invention. For purposes of this description and a description of the present invention, it will be assumed that the portion of the vessel hull available for engagement with the fender assemblies is vertically and horizontally planar which assumption is reasonable for very large vessels to which the present invention is primarily directed. Each fender assembly 30 comprises a fender 31 spaced from and extending along the pier P. A plurality of two horizontally spaced resilient mountings 32 and 34 are spaced along and extend horizontally between the fender 31 and pier P for absorbing a substantial portion of the impact energy $E_N$ of mooring vessel V. The fender 31 may be supported by the mountings 32 and 34 alone or some other means may be utilized alone or in combination therewith such as pilings, suspension lines and the like. However, the mountings 32 and 34 are preferably anchored by suitable attachment means between the fender 31 and pier P.

Figures 2, 3, 4, 5, 6, 7, 8, 9, 10, 11:
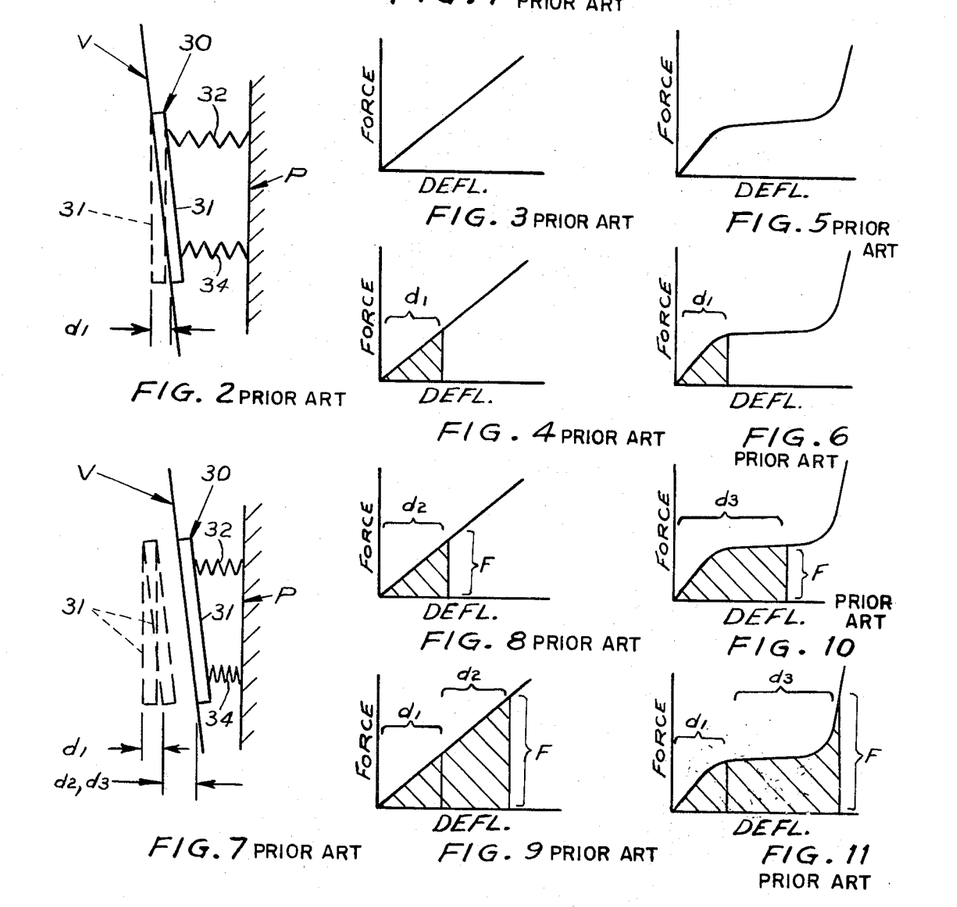
FIG. 2 is an enlarged schematic plan view of one of the fender assemblies of FIG. 1 employing a pair of spaced resilient mountings and illustrating the operation of the fender assembly upon initial engagement by the mooring vessel.
FIGS. 3 and 4 are diagramatic views illustrating the energy absorption characteristics of the respective resilient mountings of FIG. 2 having identical linear spring rates.
FIGS. 5 and 6 are diagramatic views illustrating the energy absorption characteristics of respective resilient mountings of FIG. 2 having identical non-linear spring rates.
FIG. 7 is an enlarged schematic plan view similar to FIG. 2 illustrating a further phase in the operation of the fender assembly in absorbing the impact energy of a mooring marine vessel.
FIGS. 8 and 9 are diagramatic views similar to FIGS. 3 and 4 illustrating the energy absorption characteristics of the respective resilient mounting during the phase of operation of the assembly as shown in FIG. 7.
FIGS. 10 and 11 are diagramatic views similar to FIGS. 5 and 6 illustrating the energy absorption characteristics of the respective resilient mounting during the phase of operation of the assembly as shown in FIG. 7.

With reference now to FIGs. 2–11 there is illustrated the operation of one of the fender assemblies 30 during docking of the vessel V. Since the fender 31 is uniformly spaced from the seaward edge of the pier P throughout its length and the vessel is approaching the pier P at an approach angle $\theta$, the vessel V engages the marine vessel-engaging surface of the fender 31 at an angle $\theta$. This angular engagement causes contact along a vertical line between the fender 31 and the vessel hull and preferential loading and deflection of resilient mounting 34 as shown in FIG. 2 to compensate for the approach angle at which time planar contact is established. For illustrative purposes assume the preferential deflection of mounting 34 a deflection $d_1$. In FIGS. 3 and 4 there is schematically shown the force-deflection diagrams, respectively, for mountings 32 and 34 wherein the mountings have identical linear spring rate characteristics. In FIGS. 5 and 6 there is schematically shown the force-deflection diagrams, respectively, for mountings 32 and 34 wherein the mountings have identical non-linear spring rate characteristics. Mountings having force deflection curves similar to that of FIGS. 5 and 6 have found wide acceptance in fender assemblies and will be later described in more detail. However, in both cases the mounting 34 will be deflected a distance $d_1$ to absorb the energy depicted by the shaded areas in FIGS. 4 and 6 prior to deflection of mounting 32.

In FIG. 7, the mountings 32 and 34 have been uniformly deflected from the position shown in FIG. 2 to absorb a substantial portion of the impact energy $E_N$. For the linear mounting case, both mountings 32 and 34 are deflected a distance $d_2$ from the positions shown in FIG. 2. Again the total energy absorbed by the respective mountings is indicated by the shaded areas under curves, FIGS. 8 and 9. Note the non-uniform use of the mountings 32 and 34. Because of this non-equal energy absorption and resulting non-equal deflection, it is quite possible in actual operation that one of the mountings 32 and 34 could exceed its design capability and thus, be partially ineffective in protecting the vessel V and pier P. Perhaps of more importance is the relative high reaction force F transmitted at the mounting 34 in absorbing a substantial portion of the impact energy $E_N$. A similar occurrence is noted when the mountings are non-linear, FIGS. 10 and 11. However, here the deflection between FIGS. 2 and 7 is $d_3$ rather than $d_2$. The inefficient use of the non-linear mountings is more apparent. Had the non-linear mountings been uniformly utilized, very low reaction forces F could have been attained at both mountings. While the overall reaction forces F at these mountings could be reduced by providing softer mountings and greater stroke capability, the mountings would still be non-uniformly utilized, additional deflection space would be required and the cost of the fender would in most instances be increased.

Figure 12:
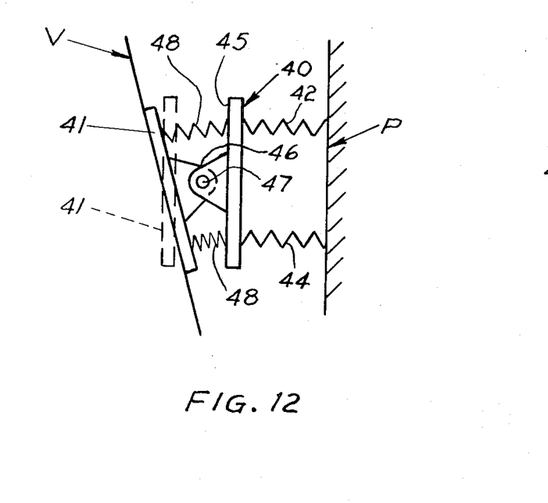
FIGS. 12 and 13 are schematic plan views illustrating two embodiments of the present invention.
Figure 13:
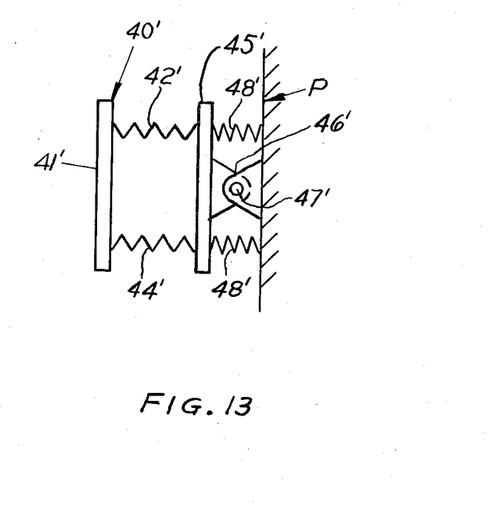

Having described in some detail the problems to be solved by the present invention, reference is now made to FIGS. 12 and 13 where two schematic illustrations of embodiments of the present invention are shown in plan view. In FIG. 12, the fender assembly 40 comprises an elongate fender 41 disposed in horizontally spaced relation from and extending along the pier P. The fender 41 has a substantially vertical and horizontal planar marine vessel-engaging surface remote from the seaward edge of the pier P. The fender 41 is normally maintained in substantially parallel relation to the edge of the pier P as shown in phantom lines in FIG. 12. An intermediate rigid support structure 45 similar to fender 41 is disposed intermediate fender 41 and pier P in substantially parallel relation to the seaward edge of the pier P. A plurality of two substantially identical and discrete resilient mountings 42 and 44 are spaced horizontally and parallel relative to each other with their central axis normal to the seaward edge of the pier P and are disposed horizontally between the edge of the pier P and intermediate support structure 45. The mountings 42 and 44 preferably have opposite ends thereof fixedly secured to the pier P and support structure 45, respectively. The intermediate support structure 45 and fender 41 are in turn interconnected by articulating means 46, symmetrically disposed geometrically relative to the mountings 42 and 44, which allows the fender 41 to be pivoted horizontally about a vertical pivot axis 47 defined by the articulating means 46. Should the mountings 42 and 44 not have identical elastic properties, the articulating means 46 would be symmetrically disposed elastically relative to the mountings 42 and 44 such that a force on the fender 41 causes equal deflection of the mountings 42 and 44. In effect, this will require positioning of the articulating means 46 along a line normal to the pier P and passing through the effective combined elastic center of the mountings 42 and 44. The articulating means 46 in a broad sense may take on any conventional design that will allow articulation about the pivot axis 47. However, depending on the form taken by the articulating means 46, it is most desirable that the fender assembly 40 include means normally biasing the fender 41 toward a predetermined marine vessel engaging position such as parallel to the pier P and illustrated in phantom lines in FIG. 12. Such biasing means may be included internally of the articulating means 46 or externally thereof. External horizontally spaced resilient mountings 48 are illustrated in parallel with the articulating means 46 between the fender 41 and support structure 45 for so biasing fender 41. It will be apparent that these resilient biasing mountings 48 should be substantially softer or of less modulus of elasticity than the primary energy absorbing mountings 42 and 44 so as not to defeat the advantages of the present invention.

Various portions of the fender assembly 40 may be independently supported. However, where such independent support is employed proper cooperation of the various portions of the fender assembly 40 must not be encumbered. In the present embodiment the mountings 42 and 44 and articulating means 46 cooperate to provide the primary support for the fender assembly 40 from the pier P. As will be apparent from the above description of the fender assembly 40, the mountings 42 and 44 and articulating means 46 are in series. As a result the marine vessel-engaging surface of fender 41 is free to articulate, that is, pivot horizontally about pivot axis 47 by the impact of a mooring vessel V so that a substantial portion of the planar fender surface is in contact with a corresponding portion of the hull of the vessel V, as illustrated, prior to significant deflection of either of the mountings 42 and 44. This insures that the impact and reaction forces are distributed over a relatively large contact area.

The fender assembly 40' illustrated in FIG. 13 includes the same elements but in a different arrangement from that of fender assembly 40 of FIG. 12. The elements of fender assembly 40' are given the same reference characters as that for fender assembly 40 with the addition of a prime notation. In the fender assembly 40' the series arrangement of the mountings 42' and 44' and articulating means 46' has been retained with their locations interchanged. In this embodiment the mountings 42' and 44' are disposed between the fender 41' and intermediate support structure 45' and the articulating means 46' interconnects the pier P and the intermediate support structure 46'. The parallel relation of the seaward edge of the pier P, intermediate support structures 45' and fender 41' has been retained. As before the marine vessel-engaging surface of fender 41' is free to articulate, that is, pivot about pivot axis 47' by the impact of a docking vessel V so that a substantial portion of the fender surface is in contact with a corresponding portion of the hull of the vessel V prior to significant deflection of either of the mountings 42' and 44'. External resilient mountings 48' are utilized for biasing fender 41' toward its normal position.

Several functional distinctions of importance are to be noted between the embodiments of FIGS. 12 and 13. The impact energy of a vessel V engaging fender assembly 40 while loading the mountings 42 and 44 substantially uniformly does not load them along their central axis perpendicular to the seaward edge of the pier P. However, in the fender assembly 40', in addition to the mountings 42' and 44' being substantially uniformly loaded, the load is applied along the central axis of the mountings irrespective of the approach angle $\theta$ of the vessel V. The significance of this distinction will be treated in a later discussion of the type mountings preferred for use in a fender assembly of the present invention. Another distinction to be noted is the difference in weight that must be supported by the mountings and articulating means when they provide the primary support for the fender assembly. In the embodiment of FIG. 12, the entire weight of the fender assembly 40 would have to be carried by the mountings 42 and 44 whereas in the embodiment of FIG. 13 only the weight of the fender 41' and the mountings 42' and 44' would have to be carried by the mountings 42' and 44'. As will be apparent, the converse is true for the articulating means. This can be of great importance depending on the relative supporting ability of the mountings and/or articulating means to be used.

Figure 14:
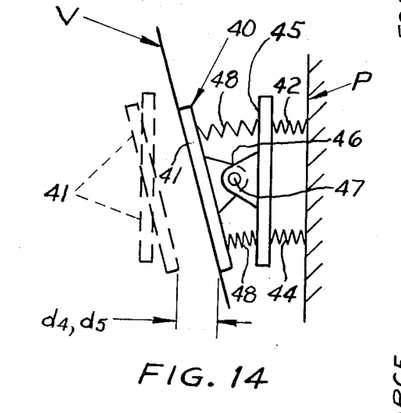
FIG. 14 is a schematic plan view of a fender assembly substantially as shown in FIG. 12 illustrating the operation thereof in the absorption of the impact energy of a mooring vessel in accordance with the present invention.

With reference now to FIGS. 14–18 the operation of a fender assembly, fender assembly 40 of FIG. 12, will be described in connection with the advantages attained thereby. First, as before indicated, the ability of the fender 41 to articulate about vertical pivot axis 47 allows the marine vessel-engaging surface thereof to contact a large corresponding area of the vessel hull prior to loading of the mountings 42 and 44. As a result, the impact or reaction force during the entire mooring operation is distributed over a large area of the vessel hull to minimize the likelihood of damage thereto. In FIG. 14, the fender assembly 40 is shown at a later phase of the mooring of a marine vessel V wherein the impact energy has been absorbed. During the mooring operation between the positions shown in FIGS. 12 and 14 both the mountings 42 and 44 are deflected so that each absorbs a substantially equal portion of the impact energy. This uniform action of the mountings insures efficient use of all the mountings in the fender assembly 40.

Figures 15, 17:
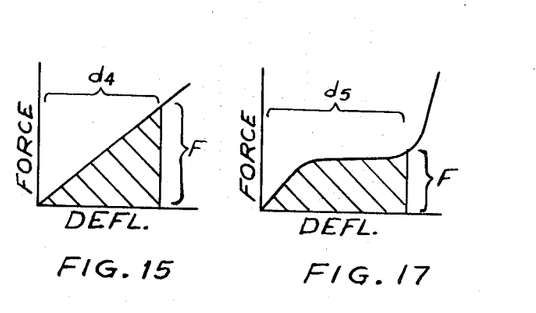
FIGS. 15 and 16 are diagramatic views illustrating the energy absorption characteristics of the respective resilient mountings of the fender assembly of FIG. 14 wherein the mountings have identical linear spring rates.
FIGS. 17 and 18 are diagramatic views illustrating the energy absorption characteristics of the respective resilient mountings of the fender assembly of FIG. 4 wherein the mountings have identical non-linear spring rates.
Figure 16:
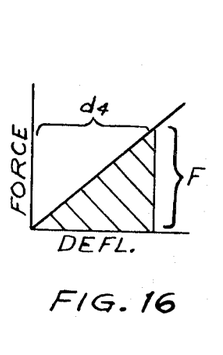
Figure 18:
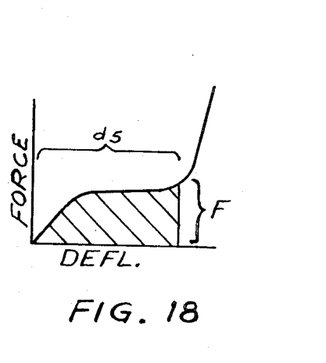

FIGS. 15 and 16 diagramatically illustrate the performance of mountings 42 and 44 wherein they have identical linear spring rate characteristics and the resistance of the articulating means 46 and resilient biasing means 48 is ignored. Note both are deflected a uniform distance, $d_4$, and the impact or reaction force F is equal for both mountings. In addition to the reaction force F being equal, the reaction force is less than in the case where no articulating means is employed. Similarly, FIGS. 17 and 18 diagramatically illustrate the performance of mountings 42 and 44 wherein they have identical non-linear spring rate characteristics. Here the mountings are deflected a uniform distance, $d_5$. The reaction force F for both mountings is equal. Perhaps of most importance for the particular type non-linear mountings represented by FIGS. 17 and 18, is that the uniform loading has not necessitated deflection of either of the mountings out of the relative flat region of the force-deflection curve, compare to FIGS. 10 and 11. As a result, the improvement of the present invention is more pronounced where this type of mounting is employed.

While the present invention is not limited to the form of the resilient mountings, elastomeric mountings are preferred. These elastomeric mountings may act in shear, compression, tension, buckling or a combination thereof. However, an elastomeric buckling type mounting is preferred. For purposes of the present invention an elastomeric buckling type mounting shall be hereinafter referred to as an "elastomeric buckling column" and defined as an elongate column of elastomer such as natural or synthetic rubber which, when unloaded, in longitudinal cross section has a length-to-width ratio of at least two to one and which under longitudinal thrusts of relatively little force acts as a column under compression and which under thrusts of greater force buckles laterally into flexure with further deflection and without substantial increase in load. The force-deflection characteristics of an elastomeric buckling column are represented by FIGS. 5, 6, 10, 11, 17 and 18. Such elastomeric buckling columns are more fully discussed, in general, in Lee, U.S. Pat. No. 2,622,836. Their particular application in fender assemblies is treated in Gensheimer, U.S. Pat. No. 3,172,268, assigned to the assignee of the present invention. Elastomeric buckling columns are particularily suited for fender assemblies because of their ability to absorb and dissipate, damp, the large impact energy of a mooring marine vessel at relatively low impact or reaction forces as compared to most other type elastomeric mountings presently known. Since buckling occurs in these mountings transverse or laterally of their longitudinal or central axis, they are most effective when loaded along that central axis. Accordingly, the fender assembly 40' of FIG. 13 is quite advantageous from this point of view where elastomeric buckling columns are employed.

The problems solved by the present invention are not confined to the horizontal plane. In order to properly absorb the impact energy of a mooring marine vessel, it is often times necessary to include in the fender assembly a vertically as well as horizontally spaced-resilient mounting means. In such instances, articulation as provided in accordance with the present invention is desired in the vertical plane to compensate for such things as roll of the vessel, a non-vertical planar hull surface, tilt of the vessel from waves or any other reason causing non-vertically planar engagement of the fender surface and hull of the vessel. Such vertical articulation may be provided for in the horizontal articulating means or may be provided in independent articulating means. Typically the amount of articulation desired in the vertical plane is less than that desired in the horizontal plane. With the above in mind the foregoing discussions are to be considered as applying in the vertical plane as well as the horizontal plane.

Figure 19:
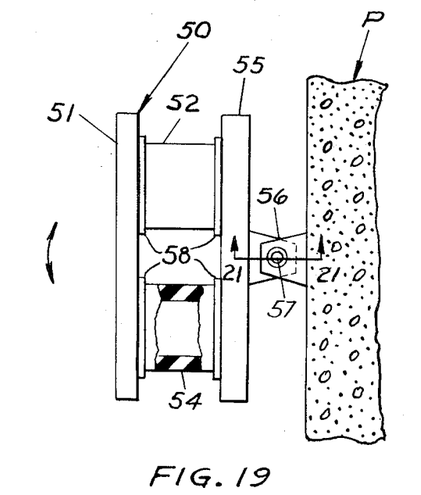
FIG. 19 is a plan view illustrating in detail a fender assembly of the present invention.
Figure 20:
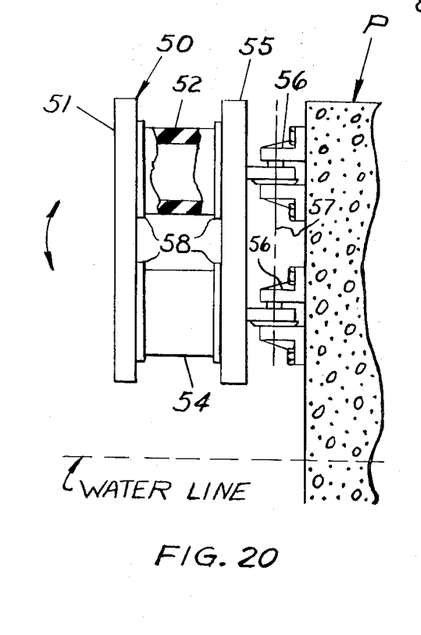
FIG. 20 is an elevational view of the fender assembly of FIG. 19.
Figure 21:
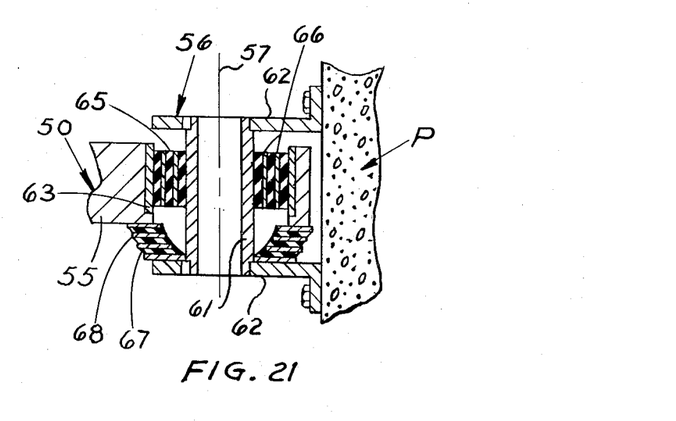
FIG. 21 is an enlarged sectional view taken substantially along the line 21—21 of FIG. 19.

With reference now to FIGS. 19–21, a detailed embodiment of a fender assembly 50 of the present invention will be described wherein very limited articulation is provided for in the vertical plane. The form of this embodiment is substantially that schematically represented in FIG. 13 and previously described. FIGS. 19 and 20 are plan and elevational views, respectively, of the fender assembly 50. The fender assembly 50 is disposed adjacent and alongisde the seaward edge of a pier P. In actual practice a plurality of the fender assemblies 50 will be disposed in horizontally spaced apart relation alongside the pier P which will cooperate to absorb a substantial portion of the impact energy of a mooring marine vessel V. The fender assembly 50 comprises a fender 51 spaced from and extending both horizontally and vertically along the pier P. The fender 51 has a substantially horizontal and vertical planar marine vessel-engaging surface remote from the pier P facing seaward. The fender 51 is normally maintained or biased in substantially parallel relation to the edge of the pier P by means to be later described. From this position the fender 51 will be available for engagement with a vessel irrespective of the approach angle thereof. An intermediate rigid support structure 55 similar to that of fender 51 is disposed intermediate fender 51 and pier P in substantially parallel relation to the fender 51. The support structure 55 extends both horizontally and vertically and in actual practice will most likely, as here illustrated, be contiguous with fender 51. A plurality of four substantially identical and discrete resilient mountings 52 and 54 are spaced along and extend horizontally between the fender 51 and support structure 55. The mountings are symmetrically spaced horizontally and vertically at the corners of an imaginary square with mountings 52 spaced horizontally at the upper level and mounting 54 spaced horizontally at the lower level.

Each of the mountings 52 and 54 comprise elongate tubular elastomeric buckling columns having a ratio of length to wall thickness of at least substantially two. The ends of the columns have end faces disposed at right angles to the elongate or central axis of the columns. Mounting plates 58 are bonded to opposite faces of the columns which plates 58 are in turn fixedly secured by conventional means to support structure 55 and fender 51, respectively, with the central axis of the mountings disposed substantially parallel to each other and perpendicular to the marine vessel-engaging surface of fender 51 and edge of pier P. In the present embodiment the mountings 52 and 54 provide the sole support for the fender 51 relative to the intermediate support structure 55. While four of these mountings have been employed in the present embodiment, it will be apparent that any number including a single mounting 52 or 54 could be employed. If a single mounting 52 or 54 is employed, spaced resilient mountings means as called for by the present invention exist. Spaced resilient mounting means would be found in the spaced wall segments, each of which meets the criteria of an elastomeric buckling column. The tubular form is quite useful because of the high energy absorption that can be accomplished in the space consumed by the mounting. Various other elastomeric buckling column designs and arrangements are also available and, thus, are contemplated for use in accordance with the present invention.

The intermediate support structure 55 and pier P are interconnected by vertically spaced and aligned identical articulating means 56 which allows the support structure 55, mountings 52 and 54 and fender 51 to be pivoted about a vertical pivot axis 57 defined by the articulating means 56. The articulating means 56 are symmetrically disposed geometrically relative to the mountings 52 and 54 for stability purposes. While two vertically spaced articulating means 56 are employed, a single articulating means 56 may also be used and is preferred where both horizontal and vertical articulation are to be provided. The articulating means 56 preferably take the form of elastomeric bearing means because of their self-biasing feature, their lack of need of lubrication and the low maintenance associated therewith. An articulating means 56 is best shown in FIG. 21 and comprises a vertically oriented inner tubular member 61 having opposite ends thereof fixedly secured by braces 62 to pier P. The braces 62, at least the lower one, extends radially outward beyond the outer diameter of the inner tubular member 61. An outer tubular member 63 is concentrically disposed about the inner tubular member 61 and has an inside diameter greater than the outside diameter of the inner tubular member 61. The outer tubular member 3 is fixedly secured to the support structure 55. An annular body 65 of elastomer such as rubber is disposed in the space between the tubular members 61 and 63 and is preferably bonded between their inner and outer surfaces, respectively. To increase the ability of the articulating means 56 to transmit impact forces between the fender assembly 50 and pier P, at least one and preferably a plurality of relatively thin tubular shims 66 of non-flexible material of successively increasing diameter are concentrically disposed about the inner tubular member 61 and are embedded in and bonded to the elastomer body 65. These shims 66 increase the resistance of the elastomer body 65 to compression without substantial effect on its shear or torsional resistance. Since elastomer is relatively soft in shear, additional means are necessary to carry the weight of the fender assembly 50.

For this purpose a body 67 of elastomer is fixedly secured such as by bonding between the lower brace 62 and the outer tubular member 63 and part of the support structure 55. This elastomer body 67 carries the weight of the fender assembly 50 in compression. The resistance of this body 67 to compression is likewise enhanced by at least one and preferably a plurality of spaced annular discs 68 embedded in and bonded to the elastomer body 67. The elastomer bodies 65 and 67 cooperate to provide the necessary functions for the articulating means 56. Articulation about the vertical pivot axis 57 is allowed by torsional deflection of the elastomer bodies 65 and 67, a mode in which elastomer is relatively soft. The resilient properties of the elastomer resiliently bias the articulating means 56 to a position where the fender 51 is parallel to the seaward edge of the pier P. The weight of the fender assembly 50 is carried primarily by compression loading of elastomer body 67, a stiff mode. Impact forces are transmitted between the fender assembly 50 and pier P by compression loading of part of elastomer body 65. Because elastomer is used in the articulating means 56, a limited amount of articulation is available in the vertical plane.

Figure 22:
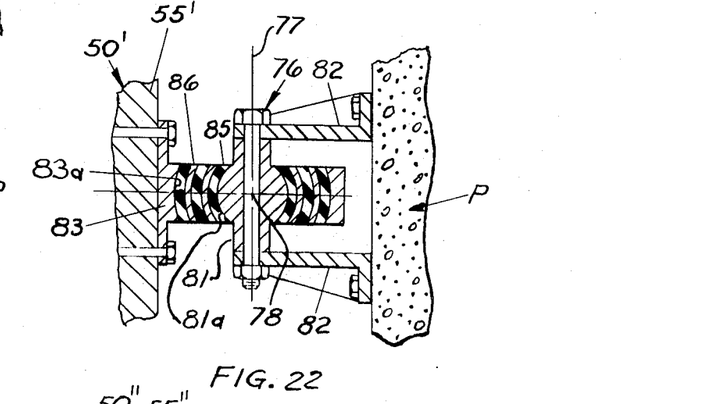
FIG. 22 is a sectional view with parts broken away of another elastomeric bearing means which may be utilized in the fender assembly of FIGS. 19 and 20.
Figure 23:
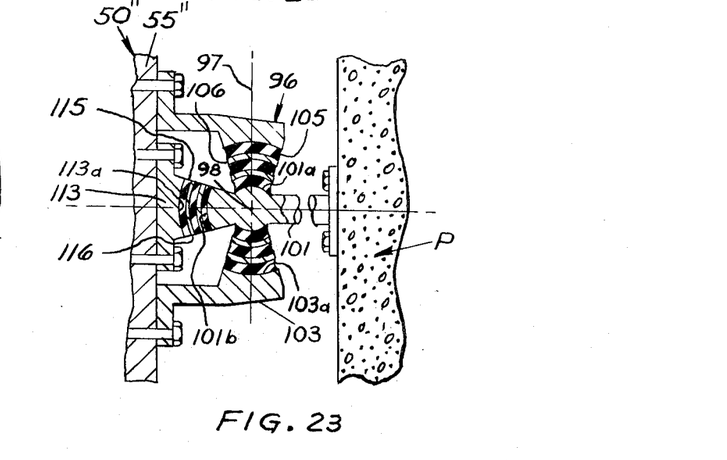
FIG. 23 is still another sectional view with parts broken away of an elastomeric bearing means which may be utilized in the fender assembly of FIGS. 19 and 20.

With the articulating means 56 disposed between the support structure 55 and pier P, the elastomeric buckling columns or mountings 52 and 54 will be articulated with the fender 51 so that the mountings will always be loaded and deflected along their central axis, the most efficient direction for energy absorption and dissipation by the mountings 52 and 54.

Where relatively large angular articulation is desired in the vertical plane other type articulating means are advantageous. There is shown in FIGS. 22 and 23 two universal articulating means that will serve this purpose. In both cases only a single one of the articulating means will be employed which, as before indicated, should be symmetrically disposed relative to the resilient mountings.

In FIG. 22, the universal articulating means is generally indicated at 76 and pivots about a vertical pivot axis 77 and a horizontal pivot axis 78. The articulating means 76 comprises an elongate inner member 81, the elongate axis of which defines vertical pivot axis 77, spaced from pier P and having opposite ends thereof fixedly secured by braces 82 to pier P for support thereof. The central portion of the elongate inner member 81 is globular or spherical in shape to define a spherical convex surface 81a transverse to the horizontal pivot axis 78. A horizontally disposed outer annular member 83 is fixedly secured to support structure 55' and is concentrically disposed about the globular portion of inner member 81 and has a spherical concave surface 83a having the same center as the spherical convex surface 81a horizontally spaced from and facing the spherical convex surface 81a. A body 85 of elastomer such as rubber is disposed and bonded between the spherical convex and concave surfaces 81a and 83a, respectively. At least one and preferably a plurality of spaced annular spherical rigid shims 86 having successively increasing radii are embedded in and bonded to the elastomer body 85 with their centers coinciding with the centers of the spherical convex and concave surfaces 81a and 83a for increasing the compressive load carrying ability thereof. From the above description, it will be apparent that the fender assembly 50' may resiliently pivot about both the vertical pivot axis 77 and horizontal pivot axis 78. Such pivoting will be accomplished by torsional deflection of the elastomer body 85. The inherent resilient properties of the elastomer body 85 normally bias and maintain the fender assembly 50' in the desired position previously indicated. Impact forces will be transmitted through the articulating means 76 by compression loading of a part of the elastomer body 85. Due to the spherical nature of the surfaces 81a and 83a and shims 86, the weight of the fender assembly 50' will partially load the elastomer body 85 in compression to such an extent that the fender assembly 50' is supported. However, when using articulating means 76 it may be desirable to also employ some external means for facilitating the support of the fender assembly 50'.

With reference to FIG. 23, there is shown another universal articulating means 96 which pivots about a vertical pivot axis 97 and a horizontal pivot axis 98. The articulating means 96 comprises an elongate inner member 101, extending normal to the edge of pier P and having one end fixedly secured to pier P. The central portion of the inner member 101 is globular or spherical in shape to define a spherical convex surface 101a transverse to the vertical pivit axis 97. A vertically disposed outer annular member 103 is fixedly secured in spaced relation to support structure 55" and is concentrically disposed about the globular portion of inner member 101 and has a spherical concave surface 103a having the same center as the spherical convex surface 101a vertically spaced from and facing the spherical convex surface 101a. A body 105 of elastomer such as rubber as disposed and bonded between the spherical convex and concave surfaces 101a and 103a, respectively. At least one and preferably a plurality of spaced annular spherical rigid shims 106 are embedded in and bonded to the elastomer body 105 with their centers coinciding with the centers of the spherical convex and concave surfaces 101a and 103a for increasing the compressive load carrying ability of the elastomer body 105.

The other end of the inner member 101 defines a spherical convex surface 101b disposed transverse to the elongate axis of member 101. A second outer member 113 fixedly secured to the support structure 55" has a spherical concave surface 113a having the same center as spherical convex surface 101b spaced from and facing the convex surface 101b. A body 115 of elastomer such as rubber is disposed and bonded between the convex and concave surfaces 101b and 113a. The compressive load carrying ability of the elastomer body 115 normal to the pier P is enhanced by at least one and preferably a plurality of spaced spherical rigid shims 116 having centers coinciding with the centers of convex and concave surfaces 101b and 113a which are embedded in and bonded to the elastomer body 115. The radius of the convex surfaces 101a and 101b, concave surfaces 103a and 113a and shims 106 and 116 are preferably the same and have the same center which center defines the universal pivot axis. Articulation about both the vertical and horizontal pivot axis 97 and 98 is resiliently provided by torsional deflection of the elastomer bodies 105 and 115. The inherent resilient properties of the elastomer bodies 105 and 115 bias the fender assembly 50" to its normally desired position. Impact forces will be transmitted primarily by compression loading of elastomer body 115. While the articulating means 96 has certain weight carrying abilities, it may be desirable to employ some external support for the fender assembly 50".

In the drawings and specification, there has been set forth several preferred embodiments of the invention and, although specific terms are employed, they are used in a generic and descriptive sense only and not for purposes of limitation.

What is claimed is:

1. A marine fender assembly for protecting a marine structure subject to the impact energy of a mooring marine vessel comprising a fender spaced from and extending horizontally along the structure, a plurality of resilient mounting means spaced horizontally along and operatively disposed in energy absorbing relation between said fender and structure, and articulating means symmetrically disposed relative to said mountings between said fender and structure in series with said mountings and operatively interconnecting said fender and structure for allowing said fender to be articulated horizontally about a vertical axis relative to the structure without significant deflection of said mounting means whereby the impact energy will be substantially uniformly absorbed by said spaced resilient mountings.

2. The marine fender assembly, according to claim 1, including resilient means cooperating with said articulating means and disposed between said fender and structure for resiliently biasing and normally maintaining said fender in a predetermined articulated relation to the structure, said resilient biasing means being relatively soft compared to said resilient energy absorbing mounting means whereby said fender may be articulated without significant deflection of said mounting means.

3. The marine fender assembly, according to claim 1, wherein said spaced resilient mounting means comprises a plurality of discrete resilient mountings.

4. The marine fender assembly, according to claim 3, wherein said articulating means is symmetrically disposed elastically relative to said mountings.

5. The marine fender assembly, according to claim 3, wherein said resilient mountings are substantially identical and said articulating means is symmetrically disposed geometrically relative to said mountings.

6. The marine fender assembly, according to claim 1, wherein said resilient mounting means and articulating means cooperate to provide substantially the sole support for said fender relative to the structure.

7. A marine fender assembly for protecting a marine structure subject to the impact energy of a mooring marine vessel comprising a fender spaced from and extending horizontally along the structure, a plurality of discrete substantially identical resilient mountings spaced horizontally along and extending horizontally in energy absorbing relation between said fender and structure with their central axis extending substantially parallel to each other and normal to the structure, and articulating means symmetrically disposed geometrically relative to said mountings between said fender and structure in series with said mountings and operatively interconnecting said fender and structure for allowing said fender to be articulated about a vertical axis relative to the structure without significant deflection of said mounting means whereby the impact energy will be substantially uniformly absorbed by said spaced resilient mountings.

8. The marine fender assembly, according to claim 7, wherein said articulating means includes means for resiliently biasing and normally maintaining said fender in a predetermined articulated relation to the structure.

9. The marine fender assembly, according to claim 7, wherein each of said resilient mountings comprise an elastomeric buckling column.

10. The marine fender assembly, according to claim 9, wherein each of said elastomeric buckling columns are tubular and have a ratio of length to wall thickness of at least two.

11. A marine fender assembly for protecting a marine structure subject to the impact energy of a mooring marine vessel comprising an elongate fender supported in spaced relation from and extending horizontally along the structure, a plurality of discrete substantially identical resilient mountings spaced horizontally along and extending horizontally in energy absorbing relation between said fender and structure with their central axis extending parallel to each other and normal to the structure and elastomeric articulating means symmetrically disposed geometrically relative to said mountings between said fender and structure in series with said mountings and operatively interconnecting said fender and structure for allowing said fender to be resiliently articulated about a vertical pivot axis without significant deflection of said resilient mountings whereby the impact energy will be substantially uniformly absorbed by said horizontally spaced resilient mountings, said articulating means resiliently biasing and normally maintaining said fender in a predetermined articulated relation to the structure.

12. The marine fender assembly, according to claim 11, wherein said elastomeric articulating means comprises
an elongate vertically disposed inner rigid member fixedly carried by one of said fender and structure the elongate axis of which defines said vertical pivot axis and having a cylindrical surface concentrically disposed about said vertical pivot axis,
an outer rigid tubular member having an inside diameter greater than the diameter of said cylindrical surface fixedly carried by the other of said fender and strucutre and concentrically disposed about said inner member, and
a body of elastomer disposed and bonded between said inner and outer members, said elastomer body resiliently accommodating articulation in a horizontal plane about said vertical pivot axis predominately in torsion and transmitting the impact force from said fender to said marine structure predominately in compression and resiliently biasing and normally maintaining said fender in a predetermined articulated relation to the structure.

13. The marine fender assembly, according to claim 12, including a plurality of spaced tubular shims of non-extensible material concentrically disposed about said pivot axis and embedded in and bonded to said elastomer body to enhance the load carrying ability thereof in compression without substantially affecting the ability of the elastomer body to accommodate articulation about said pivot axis in torsion.

14. A marine fender assembly for protecting a marine structure subject to the impact energy of a mooring marine vessel comprising a fender spaced from and extending horizontally and vertically along the structure, a plurality of discrete substantially identical resilient mountings spaced horizontally and vertically along and extending horizontally in energy absorbing relation between said fender and structure with their central axis disposed horizontally and parallel to each other and normal to the structure, and articulating means symmetrically disposed geometrically relative to said mountings between said fender and structure in series with said resilient mountings, said articulating means operatively interconnecting said fender and structure for allowing said fender to be articulated about both a vertical and horizontal pivot axis relative to said structure without significant deflection of said resilient mountings whereby the impact energy will be substantially uniformly absorbed by said plurality of spaced mountings.

15. The marine fender assembly, according to claim 14, wherein said articulating means is universal and comprises
spaced apart rigid members having opposed spherical convex and concave surfaces having coincident centers, and
a body of elastomer disposed and bonded between said surfaces and resiliently accommodating universal articulation about said coincident center by torsional deflection of said elastomer body and transmitting impact forces through said elastomer body substantially in compression, said elastomer body resiliently biasing and normally maintaining said fender in a predetermined articulated relation to the structure.

16. The marine fender assembly, according to claim 15, including a plurality of spaced spherical shims of non-extensible material having centers coincident with said spherical surfaces center embedded in and bonded to said elastomer body to enhance the load carrying ability of said elastomer body in compression without substantially affecting the ability of said elastomer body to accommodate articulation about said center.

17. A marine fender assembly for protecting a marine structure subject to the impact energy of a mooring marine vessel comprising fender means spaced horizontally from and extending horizontally along the structure, intermediate rigid support means disposed horizontally between said fender and strucutre, a plurality of resilient mounting means spaced horizontally along and between said fender and support means with said support means and fender rigidly interconnecting said mounting means, and articulating means symmetrically disposed elastically relative to said spaced resilient mounting means between said support means and structure in series with said resilient mounting means and operatively interconnecting said support means and structure for allowing said support means and spaced resilient mounting means to be articulated horizontally about a vertical axis relative to the structure without significant deflection of said resilient mountings whereby the impact energy will be substantially uniformly absorbed by said spaced resilient mounting means.

18. A marine fender assembly for protecting a marine pier subject to the impact energy of a mooring marine vessel comprising a fender spaced from and extending along the pier and having a marine vessel-engaging surface remote from the pier in substantially parallel relation to the pier, intermediate rigid support means disposed between said fender and pier, a plurality of discrete substantially identical resilient mountings spaced along and connected horizontally between said support means and pier with their central axis extending substantially parallel to each other and normal to said marine vessel-engaging surface and pier, articulating means symmetrically disposed geometrically relative to said mountings between and operatively interconnecting said support means and fender for allowing said marine vessel-engaging surface to be articulated horizontally about a vertical pivot axis by the impact of a marine vessel relative to said support means prior to significant deflection of said resilient mountings with said resilient mountings substantially uniformly absorbing the impact energy of a mooring marine vessel.

19. The marine fender assembly, according to claim 18, including resilient means disposed between said support means and fender and cooperating with said articulating means for resiliently biasing and normally maintaining said fender in substantially parallel relation to the pier, said resilient biasing means being relatively soft compared to said resilient energy absorbing mounting means whereby said fender may be articulated without significant deflection of said mounting means.

20. A marine fender assembly for protecting a marine pier subject to the impact energy of a mooring marine vessel comprising a fender spaced from and extending along the pier and having a marine vessel-engaging surface remote from the pier in substantially parallel relation to the pier, intermediate rigid support means disposed between said fender and pier, a plurality of discrete substantially identical resilient mountings spaced along and connected horizontally between said fender and support means with their central axis disposed substantially parallel to each other and normal to said marine vessel-engaging surface, articulating means symmetrically disposed geometrically relative to said mountings between and operatively interconnecting said support means and pier for allowing said marine vessel-engaging surface and mountings to be articulated horizontally about a vertical pivot axis by the impact of a marine vessel relative to the pier prior to significant deflection of said mountings with said resilient mountings substantially uniformly absorbing the impact energy of a mooring marine vessel along the central axis of said mountings.

21. The marine fender assembly, according to claim 20, including resilient means disposed between said support means and pier and cooperating with said articulating means for resiliently biasing and normally maintaining said fender in substantially parallel relation to the pier, said resilient biasing means being relatively soft compared to said resilient energy absorbing mounting means whereby said fender may be articulated without significant deflection of said mounting means.

22. The marine fender assembly, according to claim 21, wherein each of said resilient mountings comprise a tubular elastomeric buckling column having a ratio of length to wall thickness of at least two.

23. A marine fender assembly for protecting a marine structure subject to the impact energy of a mooring marine vessel comprising fender means spaced horizontally from and extending horizontally along the structure, intermediate rigid support means disposed horizontally between said fender and structure, a plurality of resilient mounting means spaced horizontally along and between said support means and structure with said support means and structure rigidly interconnecting said mounting means, and articulating means symmetrically disposed elastically relative to said spaced resilient mounting means between said fender and support means in series with said resilient mounting means and operatively interconnecting said fender and support means for allowing said fender to be articulated horizontally about a vertical axis relative to said structure without significant deflection of said mounting means whereby the impact energy will be substantially uniformly absorbed by said spaced resilient mounting means.

* * * * *